US011746699B2

(12) United States Patent
Okuwa et al.

(10) Patent No.: US 11,746,699 B2
(45) Date of Patent: Sep. 5, 2023

(54) GAS TURBINE ENGINE (71) Applicant: KAWASAKI JUKOGYO KABUSHIKI KAISHA, Kobe (JP)

(72) Inventors: Tatsuya Okuwa, Kobe (JP); Takafumi Fujii, Kobe (JP); Hayato Hirota, Kobe (JP); Hikaru Maesato, Kobe (JP); Atsunori Arai, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 27 days.

(21) Appl. No.: 17/638,556

(22) PCT Filed: Aug. 27, 2020

(86) PCT No.: PCT/JP2020/032457
§ 371 (c)(1),
(2) Date: Feb. 25, 2022

(87) PCT Pub. No.: WO2021/039927
PCT Pub. Date: Mar. 4, 2021

(65) Prior Publication Data
US 2022/0316396 A1  Oct. 6, 2022

(30) Foreign Application Priority Data

Aug. 30, 2019 (JP) .................... 2019-157864

(51) Int. Cl.
F02C 7/06 (2006.01)
F02C 7/16 (2006.01)
F02C 9/18 (2006.01)

(52) U.S. Cl.
CPC .............. *F02C 7/06* (2013.01); *F02C 7/16* (2013.01); *F02C 9/18* (2013.01); *F05D 2220/32* (2013.01);
(Continued)

(58) Field of Classification Search
CPC ..... F01D 25/18; F02C 6/08; F02C 7/06; F02C 7/14; F02C 7/16; F02C 9/18; F02K 3/115;
(Continued)

(56) References Cited

U.S. PATENT DOCUMENTS 3,107,489 A * 10/1963 Palfreyman ............... F02C 7/32
60/39.093
4,083,181 A    4/1978 Adamson
(Continued)

FOREIGN PATENT DOCUMENTS

JP    53-1710 A    1/1978
JP    10-89087 A    4/1998
(Continued)

OTHER PUBLICATIONS

International Search Report for PCT/JP2020/032457 dated, Nov. 2, 2020 (PCT/ISA/210).

*Primary Examiner* — Jesse S Bogue
(74) *Attorney, Agent, or Firm* — Sughrue Mion, PLLC (57) ABSTRACT A gas turbine engine includes: a fan that is in front of a compressor and rotates in association with a rotating shaft; a casing including an inner shell and an outer shell and a bypass passage; bearings inside the inner shell; an oil mist generator that is outside the outer shell and generates oil mist by mixing oil with compressed air extracted through an extraction port of the compressor; an air pipe through which the compressed air extracted from the compressor is guided to the oil mist generator; and an oil mist pipe through which the oil mist generated by the oil mist generator is guided to the bearings. At least one of the air pipe and the oil mist pipe includes a heat exchanger that is in the bypass passage and is cooled by the air flowing through the bypass passage.

6 Claims, 7 Drawing Sheets (52) U.S. Cl.
CPC ...... *F05D 2240/50* (2013.01); *F05D 2260/98* (2013.01)

(58) Field of Classification Search
CPC ............ F05D 2220/32; F05D 2240/50; F05D 2260/98; F16N 2210/02; F16N 2210/14; F16N 7/32
See application file for complete search history.

(56) References Cited

U.S. PATENT DOCUMENTS

| | | | | |
|---|---|---|---|---|
| 4,561,246 | A * | 12/1985 | Hovan | F02C 7/185 |
| | | | | 415/176 |
| 6,035,627 | A * | 3/2000 | Liu | F04D 29/0513 |
| | | | | 415/176 |
| 7,748,209 | B1 | 7/2010 | Schopf et al. | |
| 7,862,293 | B2 * | 1/2011 | Olver | F01D 25/12 |
| | | | | 415/177 |
| 11,181,007 | B1 * | 11/2021 | Ress, Jr. | F01D 25/125 |
| 2007/0245706 | A1 * | 10/2007 | Bell | F02C 7/224 |
| | | | | 184/6.28 |
| 2015/0352477 | A1 * | 12/2015 | Fujii | B01D 45/14 |
| | | | | 55/447 |
| 2017/0268535 | A1 | 9/2017 | Mondal et al. | |
| 2022/0290607 | A1 * | 9/2022 | Fujii | F01D 25/18 |
| 2022/0290616 | A1 * | 9/2022 | Okuwa | F01D 15/10 |
| 2023/0068146 | A1 * | 3/2023 | Maesato | F01D 25/16 |

FOREIGN PATENT DOCUMENTS

| | | | |
|---|---|---|---|
| JP | 2001-165390 A | 6/2001 | |
| JP | 2017-187021 A | 10/2017 | |

* cited by examiner

GAS TURBINE ENGINE

CROSS REFERENCE TO RELATED APPLICATIONS

This application is a National Stage of International Application No. PCT/JP2020/032457 filed Aug. 27, 2020, claiming priority based on Japanese Patent Application No. 2019-157864 filed Aug. 30, 2019.

TECHNICAL FIELD

The present disclosure relates to a gas turbine engine.

BACKGROUND ART

PTL 1 discloses a mechanism that supplies oil mist to a bearing in a gas turbine engine of a flying object. According to this oil mist supply mechanism, while the flying object is flying, compressed air is introduced from a compressor of the engine to an oil mist generating means. The oil mist generating means generates the oil mist from oil by the introduced compressed air. The generated oil mist is supplied to the bearing.

CITATION LIST

Patent Literature

PTL 1: Japanese Laid-Open Patent Application Publication No. 2001-165390

SUMMARY OF INVENTION

Technical Problem

Lubrication performance of oil used to lubricate a bearing decreases as the temperature of the oil increases. Therefore, it is desirable to supply lower-temperature oil mist to the bearing. However, for example, to suppress air resistance when the gas turbine engine is mounted on an airframe, a frontal projected area of the gas turbine engine is required to be reduced as much as possible, and the size of the gas turbine engine is required to be reduced. It is not desirable to increase the size of the gas turbine engine by a heat exchanger that cools the oil mist.

An object of the present disclosure is to provide a gas turbine engine capable of supplying lower-temperature oil mist to a bearing while realizing downsizing of the gas turbine engine.

Solution to Problem

In order to solve the above problems, a gas turbine engine according to one aspect of the present disclosure is a gas turbine engine in which a compressor, a combustor, and a turbine are arranged so as to be lined up along a rotating shaft. The gas turbine engine includes: a fan that is arranged in front of the compressor and rotates in association with the rotating shaft; a casing including an inner shell accommodating the compressor, the combustor, and the turbine and an outer shell arranged such that a bypass passage through which part of air supplied by the fan flows exists between the inner shell and the outer shell; bearings arranged inside the inner shell; an oil mist generator that is arranged outside the outer shell and generates oil mist by mixing oil with compressed air extracted through at least one extraction port of the compressor; at least one air pipe through which the compressed air extracted from the compressor is guided to the oil mist generator; and at least one oil mist pipe through which the oil mist generated by the oil mist generator is guided to the bearings. At least one of the air pipe and the oil mist pipe includes a heat exchanger that is arranged in the bypass passage and is cooled by the air flowing through the bypass passage.

According to the above configuration, the compressed air and/or the oil mist flowing inside the heat exchanger are cooled by the low-temperature air flowing through the bypass passage. Therefore, an additional heat exchanger that cools the oil mist does not have to be disposed at the gas turbine engine. Or, such additional heat exchanger can be downsized. On this account, the lower-temperature oil mist can be supplied to the bearings while realizing the downsizing of the gas turbine engine.

Advantageous Effects of Invention

The present disclosure can provide a gas turbine engine capable of suppling lower-temperature oil mist to a bearing while realizing a size reduction.

DESCRIPTION OF EMBODIMENTS

Hereinafter, embodiments will be described with reference to the drawings. In the following description, a "front side" denotes an upstream side in a direction in which air flows in an engine, and a "rear side" denotes a downstream side in the direction in which the air flows in the engine. To be specific, the "front side" denotes a side where a fan is disposed, in an axial direction of a rotating shaft of the engine, and the "rear side" denotes a side opposite to the side where the fan is disposed, in the axial direction of the rotating shaft of the engine. A "radial direction" denotes a direction orthogonal to a rotation axis of the rotating shaft of the engine. A "circumferential direction" denotes a direction around the rotation axis of the rotating shaft of the engine. Moreover, in the present description, an "aircraft" is a concept including an airplane, an unmanned flying object, and the like each of which flies by propulsive force generated by a gas turbine.

Embodiment 1

Figure 1:
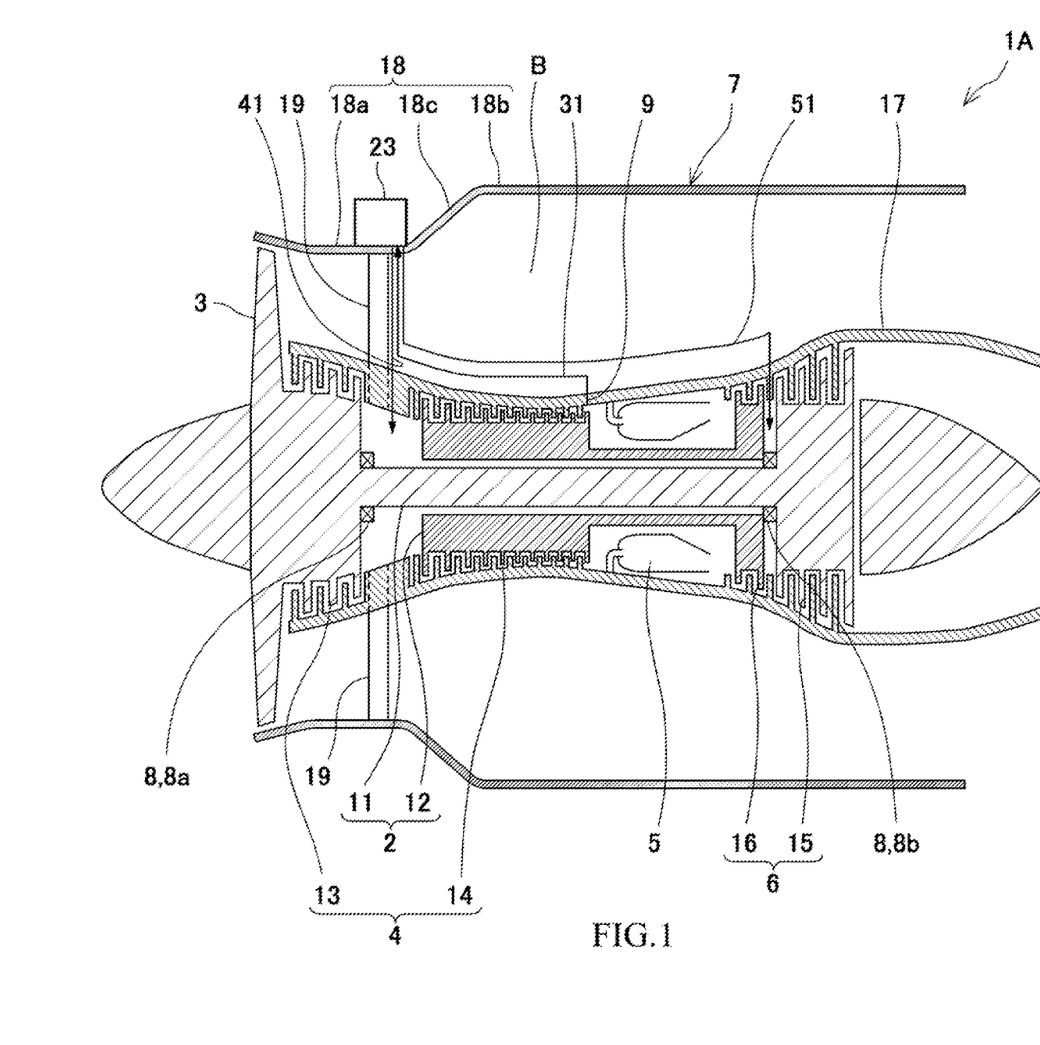
FIG. 1 is a schematic sectional view of an aircraft gas turbine engine according to Embodiment 1.
Figure 2:
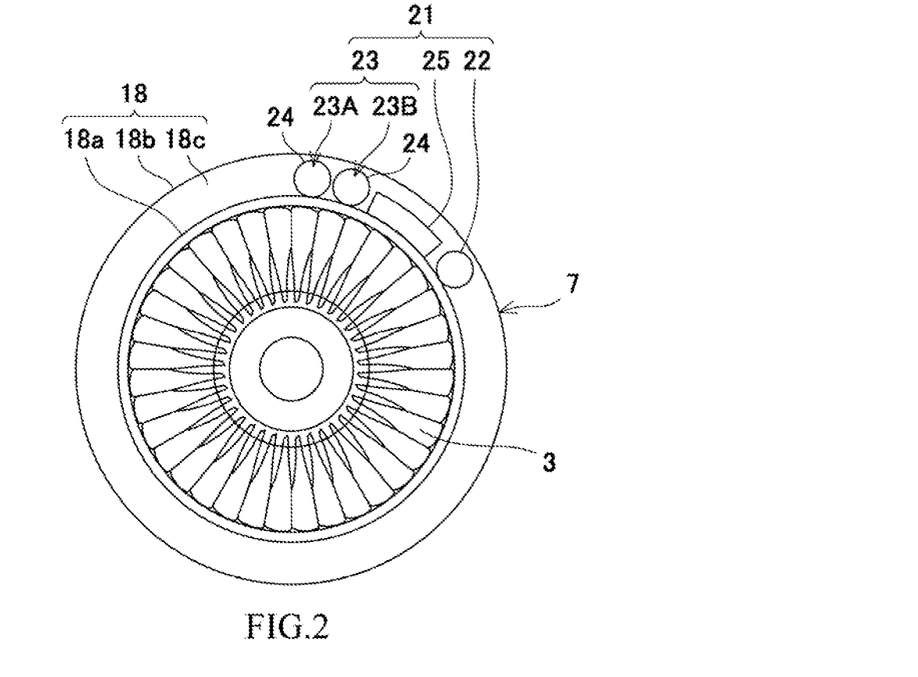
FIG. 2 is a front view of the aircraft gas turbine engine of FIG. 1 when viewed from the front.

FIG. 1 is a sectional view of an aircraft gas turbine engine 1A according to Embodiment 1. FIG. 2 is a front view of the gas turbine engine 1A of FIG. 1 when viewed from the front. In the present embodiment and Embodiment 2 described below, the aircraft gas turbine engine is described as a gas turbine engine. However, the gas turbine engine is not especially limited to the aircraft gas turbine engine. As shown in FIG. 1, the aircraft gas turbine engine 1A includes a rotating shaft 2, a fan 3, a compressor 4, a combustor 5, a turbine 6, and a casing 7. The rotating shaft 2 extends in a front-rear direction of the gas turbine engine 1A. The rotating shaft 2 is supported by bearings 8 arranged along an axial direction of the rotating shaft 2. The fan 3 is connected to a front portion of the rotating shaft 2 and rotates together with the rotating shaft 2. The compressor 4, the combustor 5, and the turbine 6 are lined up in this order from the front side toward the rear side along the rotating shaft 2. The casing 7 is a tubular object having an axis that coincides with a rotation axis of the rotating shaft 2. The casing 7 accommodates the rotating shaft 2, the fan 3, the compressor 4, the combustor 5, and the turbine 6.

Specifically, the gas turbine engine 1A is a two-shaft gas turbine engine. The compressor 4 includes a low-pressure compressor 13 and a high-pressure compressor 14 arranged behind the low-pressure compressor 13. For example, both the low-pressure compressor 13 and the high-pressure compressor 14 are axial flow compressors. However, the types of the low-pressure compressor 13 and the high-pressure compressor 14 are not limited to this. For example, the high-pressure compressor 14 may be a centrifugal compressor. The turbine 6 includes a low-pressure turbine 15 and a high-pressure turbine 16 arranged in front of the low-pressure turbine 15. The rotating shaft 2 includes a low-pressure shaft 11 and a high-pressure shaft 12. The low-pressure shaft 11 couples the low-pressure compressor 13 to the low-pressure turbine 15. The high-pressure shaft 12 couples the high-pressure compressor 14 to the high-pressure turbine 16. The high-pressure shaft 12 is a tubular shaft including a hollow space therein. The low-pressure shaft 11 is inserted into the hollow space of the high-pressure shaft 12. The low-pressure turbine 15 is coupled to the fan 3 through the low-pressure shaft 11.

The casing 7 includes an inner shell 17, an outer shell 18, and struts 19. The inner shell 17 has a substantially cylindrical shape and accommodates the compressor 4, the combustor 5, and the turbine 6. The outer shell 18 has a substantially cylindrical shape and is arranged concentrically with the inner shell 17 so as to be spaced apart from the inner shell 17 outward in the radial direction. The inner shell 17 is higher in rigidity than the outer shell 18. The struts 19 are arranged at intervals in the circumferential direction. Each strut 19 couples the inner shell 17 to the outer shell 18. In the present embodiment, the strut 19 extends inward in the radial direction from the outer shell 18, penetrates the inner shell 17 in the radial direction, and extends to a passage of air compressed by the compressor 4. In the present embodiment, the struts 19 are arranged at positions between the low-pressure compressor 13 and the high-pressure compressor 14 in the axial direction of the rotating shaft 2. However, the positions of the struts 19 are not limited to this. The casing 7 may include a strut or struts other than the struts 19. For example, the casing 7 may include a strut or struts in front of the low-pressure compressor 13 in the axial direction of the rotating shaft 2 or behind the high-pressure compressor 14 in the axial direction of the rotating shaft 2. A cylindrical bypass passage B is formed between the inner shell 17 and the outer shell 18. Part of the air sucked by the fan 3 is supplied to an inside of the inner shell 17, i.e., to the low-pressure compressor 13, and the rest of the air flows through the bypass passage B and is discharged to the rear side.

As shown in FIG. 1 and FIG. 2, an outer peripheral surface of the outer shell 18 of the casing 7 includes a first region 18a, a second region 18b, and a third region 18c. The second region 18b is located behind the first region 18a, and the third region 18c connects the first region 18a and the second region 18b. The first region 18a is smaller in diameter than the second region 18b. The first region 18a is located at a position corresponding to at least the low-pressure compressor 13 in the front-rear direction (rotation axis direction). The second region 18b is located at a position corresponding to at least the combustor 5 in the front-rear direction (rotation axis direction). The third region 18c is an inclined region that gradually increases in diameter toward the rear side.

Electrically-operated accessories 21 are disposed in the first region 18a along an outer peripheral surface of the first region 18a. The electrically-operated accessories 21 are arranged at a radially inner side of an outer peripheral surface of the second region 18b when viewed from the front. The electrically-operated accessories 21 includes an electrically-operated fuel pump 22, an oil mist generator 23, and a controller 25. The electrically-operated fuel pump 22 supplies fuel of a fuel tank (not shown) to the combustor 5. The oil mist generator 23 generates oil mist by mixing oil with compressed air extracted from the compressor 4. The controller 25 controls the electrically-operated fuel pump 22 and the oil mist generator 23 in accordance with predetermined sensor data and an external command.

The oil mist generator 23 includes a first oil mist generator 23A and a second oil mist generator 23B. Each of the first and second oil mist generators 23A and 23B includes a lubricating oil tank (not shown) and an electrically-operated lubricating oil pump 24 that mixes oil of the lubricating oil tank with the compressed air extracted from the compressor 4. The electrically-operated lubricating oil pumps 24 of the first and second oil mist generators 23A and 23B are lined up in the circumferential direction along the outer peripheral surface of the outer shell 18 of the casing 7.

An air pipe 31, a first oil mist pipe 41, and a second oil mist pipe 51 are connected to the oil mist generator 23. The air pipe 31 guides the compressed air, extracted from the compressor 4, to the oil mist generator 23. The air pipe 31 is connected to an extraction port 9 through which the compressed air compressed by the compressor 4 is extracted. The extraction port 9 is located at such a position that the compressed air is extracted from an intermediate stage or final stage of the high-pressure compressor 14 in the inner shell 17, for example. The extraction port 9 may be located at an intermediate stage of the low-pressure compressor 13 or between the low-pressure compressor 13 and the high-pressure compressor 14.

The compressed air guided through the air pipe 31 flows into the first and second oil mist pipes 41 and 51. Specifically, the first oil mist generator 23A generates the oil mist in such a manner that the electrically-operated lubricating oil pump 24 thereof discharges a small amount of oil to the compressed air supplied through the air pipe 31. The oil mist generated by the first oil mist generator 23A is guided to the first oil mist pipe 41. The second oil mist generator 23B generates the oil mist in such a manner that the electrically-operated lubricating oil pump 24 thereof discharges a small amount of oil to the compressed air supplied from the air pipe 31. The oil mist generated by the second oil mist generator 23B is guided to the second oil mist pipe 51.

The first and second oil mist pipes 41 and 51 guide the oil mist, generated by the oil mist generator 23, to the bearings 8 supporting the rotating shaft 2 in a radially inner space of the inner shell 17.

Specifically, the bearings 8 include a front bearing 8a and a rear bearing 8b. The front bearing 8a is located in front of the extraction port 9, and the rear bearing 8b is located behind the extraction port 9. The front bearing 8a supports a portion of the low-pressure shaft 11 which portion is located at the front side of the high-pressure shaft 12. The rear bearing 8b supports a portion of the low-pressure shaft 11 which portion is located at the rear side of the high-pressure shaft 12. The first oil mist pipe 41 supplies the oil mist to the front bearing 8a (more specifically, a bearing chamber accommodating the front bearing 8a) to lubricate the front bearing 8a. The second oil mist pipe 51 supplies the oil mist to the rear bearing 8b (more specifically, a bearing chamber accommodating the rear bearing 8b) to lubricate the rear bearing 8b.

The oil mist having cooled the front bearing 8a and the rear bearing 8b is guided through a discharge passage (not shown) toward the bypass passage B and is discharged to the bypass passage B. For example, the discharge passage may be disposed in the struts 19 and the strut(s) arranged at a different position(s). The air pipe 31 and the first and second oil mist pipes 41 and 51 may be partially formed by a casing, a housing, or the like.

Figure 3:
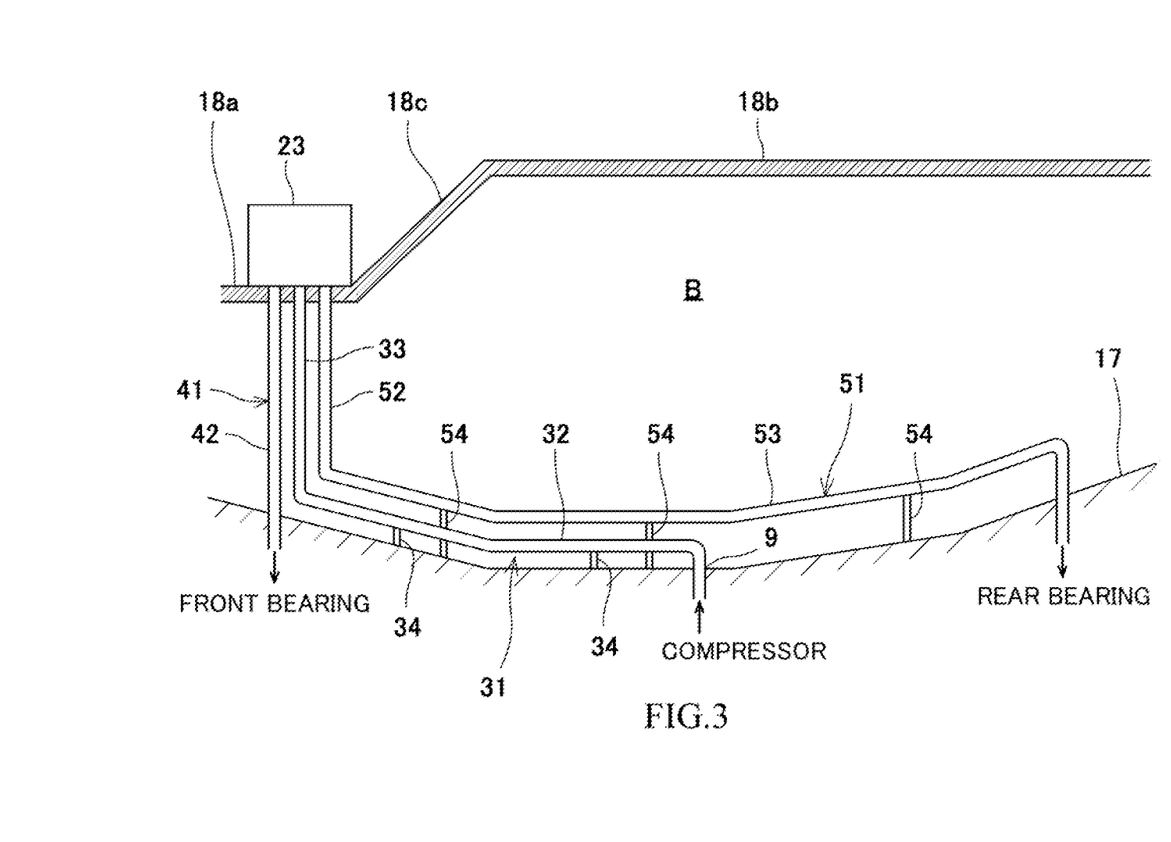
FIG. 3 is an enlarged view of a part of a bypass passage shown in FIG. 1.

FIG. 3 is an enlarged view of a part of the bypass passage B shown in FIG. 1. In FIG. 3, the strut 19 is not shown. The extraction port 9 is located behind the oil mist generator 23. The extraction port 9 is located behind the third region 18c in the axial direction of the rotating shaft 2. The air pipe 31 extends in the bypass passage B forward from the vicinity of the extraction port 9 in the axial direction of the rotating shaft 2 along an outer surface of the inner shell 17. Then, at a position corresponding to the oil mist generator 23 in the axial direction, the air pipe 31 extends outward in the radial direction from the vicinity of the outer surface of the inner shell 17, penetrates the first region 18a of the outer shell 18, and is connected to the oil mist generator 23.

The air pipe 31 includes a first heat exchanger 32 and a second heat exchanger 33. The first and second heat exchangers 32 and 33 are arranged in the bypass passage B and are cooled by contact with the air flowing through the bypass passage B. In the present embodiment, the first and second heat exchangers 32 and 33 are exposed in the bypass passage B.

The first heat exchanger 32 extends in the bypass passage B in the axial direction of the rotating shaft 2 along the outer surface of the inner shell 17. Specifically, the first heat exchanger 32 extends from a position corresponding to the extraction port 9 in the axial direction of the rotating shaft 2 to a position corresponding to the oil mist generator 23 in the axial direction of the rotating shaft 2. The first heat exchanger 32 is supported by the outer surface of the inner shell 17 through at least one support 34 extending in the radial direction. A downstream end portion of the first heat exchanger 32 in a flow direction of the compressed air is connected to an upstream end portion of the second heat exchanger 33 in the flow direction of the compressed air. The second heat exchanger 33 extends in the bypass passage B in the radial direction of the rotating shaft 2 toward the oil mist generator 23. The compressed air flowing in the first and second heat exchangers 32 and 33 is cooled by low-temperature air flowing through the bypass passage B and is guided to the oil mist generator 23.

In the present embodiment, the front bearing 8a is arranged at a position corresponding to the oil mist generator 23 in the axial direction of the rotating shaft 2 (also see FIG. 1). The first oil mist pipe 41 extends in the radial direction from the first oil mist generator 23A toward the front bearing 8a so as to penetrate the first region 18a of the outer shell 18 and the inner shell 17.

The first oil mist pipe 41 includes a third heat exchanger 42. The third heat exchanger 42 is arranged in the bypass passage B and is cooled by contact with the air flowing through the bypass passage B. In the present embodiment, the third heat exchanger 42 is exposed in the bypass passage B. The oil mist flowing in the third heat exchanger 42 is cooled by the low-temperature air flowing through the bypass passage B and is guided to the front bearing 8a. For example, the third heat exchanger 42 of the first oil mist pipe 41 may be located on an outer surface of the strut 19 (not shown in FIG. 3) so as to be able to contact the air flowing through the bypass passage B.

The rear bearing 8b is arranged behind the extraction port 9 in the axial direction of the rotating shaft 2. The second oil mist pipe 51 extends inward in the radial direction from the oil mist generator 23B and penetrates the first region 18a of the outer shell 18. Then, the second oil mist pipe 51 extends in the bypass passage B in the axial direction of the rotating shaft 2 along the outer surface of the inner shell 17 and penetrates the outer shell 18 at a position corresponding to the rear bearing 8b in the axial direction.

The second oil mist pipe 51 includes a fourth heat exchanger 52 and a fifth heat exchanger 53. The fourth and fifth heat exchangers 52 and 53 are arranged in the bypass passage B and is cooled by contact with the air flowing through the bypass passage B. In the present embodiment, the fourth and fifth heat exchangers 52 and 53 are exposed in the bypass passage B.

The fourth heat exchanger 52 is located at a position corresponding to the oil mist generator 23 in the axial direction of the rotating shaft 2. The fourth heat exchanger 52 extends in the bypass passage B in the radial direction of the rotating shaft 2. A downstream end portion of the fourth heat exchanger 52 in the flow direction of the oil mist is connected to an upstream end portion of the fifth heat exchanger 53 in the flow direction of the oil mist. The fifth heat exchanger 53 extends in the bypass passage B in the axial direction of the rotating shaft 2 along the outer surface of the inner shell 17. The fifth heat exchanger 53 extends from a position corresponding to the oil mist generator 23 in the axial direction of the rotating shaft 2 to a position corresponding to the rear bearing 8b in the axial direction of the rotating shaft 2. The fifth heat exchanger 53 is supported by the outer surface of the inner shell 17 through at least one support 54 extending in the radial direction. The oil mist flowing in the fourth and fifth heat exchangers 52 and 53 is cooled by the low-temperature air flowing through the bypass passage B and is guided to the rear bearing 8b.

According to the above-described configuration, the compressed air flowing in the heat exchangers 32 and 33 is cooled by the low-temperature air flowing through the bypass passage B, and the oil mist flowing in the heat exchangers 42, 52, and 53 is cooled by the low-temperature air flowing through the bypass passage B. Therefore, an additional heat exchanger that cools the oil mist does not have to be disposed at the gas turbine engine. Or, such additional heat exchanger can be downsized. On this account, the lower-temperature oil mist can be supplied to the bearings while realizing the downsizing of the gas turbine engine.

Moreover, since the heat exchangers 32 and 53 extend in the bypass passage B in the axial direction of the rotating shaft 2, the heat exchangers can be lengthened by a simple configuration, and the compressed air and the oil mist flowing in the heat exchangers 32 and 53 can be further reduced in temperature.

Moreover, the first and second oil mist generators 23A and 23B are located on the outer peripheral surface of the outer shell 18 and in front of the extraction port 9, and the heat exchanger 32 included in the air pipe 31 extends in the bypass passage B in the axial direction. Therefore, the heat exchanger 32 can be lengthened while suppressing an increase in entire length of the air pipe 31.

Moreover, since the first region 18a of the outer peripheral surface of the outer shell 18 on which the oil mist generator 23 is disposed is reduced in diameter, the amount of projection of the oil mist generator 23 outward in the radial direction can be reduced, and the frontal projected area of the gas turbine engine can be reduced.

Since the oil mist generator 23 includes the first oil mist generator 23A and the second oil mist generator 23B, the individual oil mist generators can be downsized, and the amount of projection of the oil mist generator 23 outward in the radial direction can be further reduced.

Moreover, the rear bearing 8b located close to the combustor 5 tends to become high in temperature. However, in the present embodiment, since both the heat exchanger 32 of the air pipe and the heat exchanger 53 of the second oil mist pipe 51 extend in the bypass passage B in the axial direction, the oil mist to be guided to the rear bearing 8b can be further reduced in temperature, and coolability of the rear bearing 8b can be improved.

Moreover, the second heat exchanger 33 and the fourth heat exchanger 52 extending in the bypass passage B in the axial direction are supported by the outer peripheral surface of the inner shell 17. Therefore, the air pipe 31 and the second oil mist pipe 51 can be supported more stably than a case where the second heat exchanger 33 and the fourth heat exchanger 52 are supported by the outer shell 18 whose rigidity is lower than the rigidity of the inner shell 17.

Modified Example 1

Figure 4:
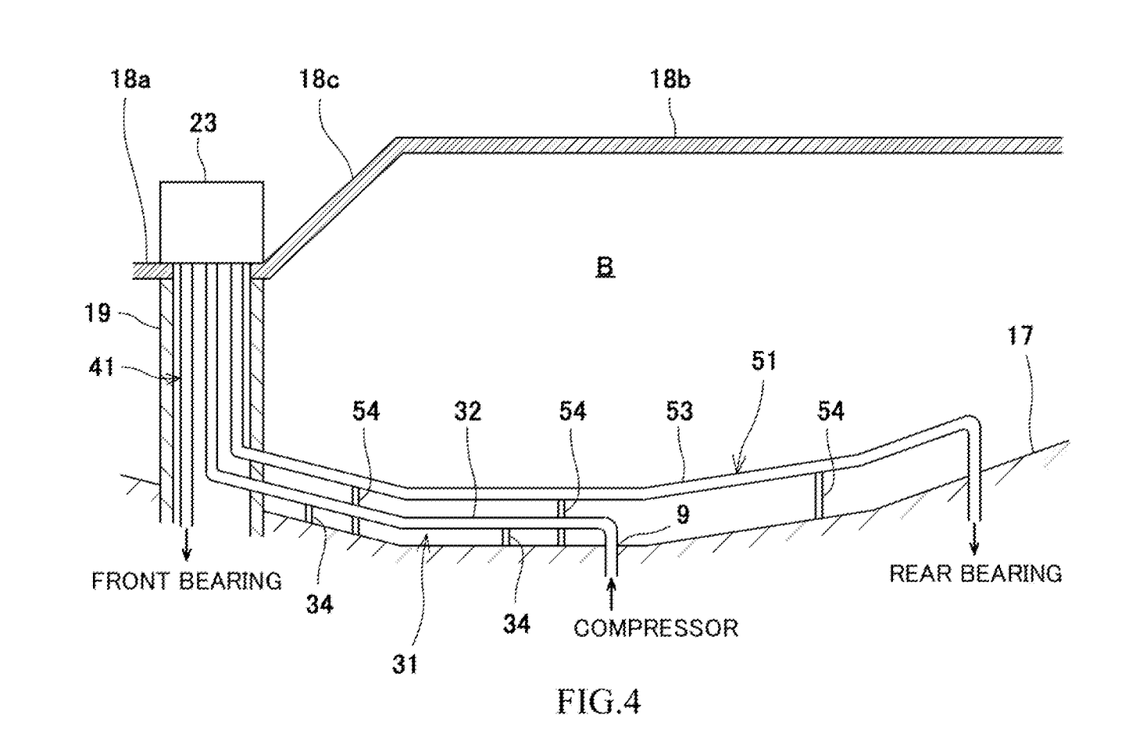
FIG. 4 is an enlarged view of a part of the bypass passage of the aircraft gas turbine engine according to Modified Example 1 of Embodiment 1.

FIG. 4 is an enlarged view of a part of the bypass passage of the aircraft gas turbine engine according to Modified Example 1 of Embodiment 1. In Modified Example 1, the strut 19 is hollow. The strut 19 is formed such that the air from the bypass passage B does not flow into an internal space of the strut 19. A portion of the air pipe 31 which portion extends in the axial direction of the rotating shaft 2 and a portion of the second oil mist pipe 51 which portion extends in the axial direction of the rotating shaft 2 penetrate a peripheral wall of the strut 19. Moreover, portions of the air pipe 31 and the first and second oil mist pipes 41 and 51 which portions are located between the inner shell 17 and the outer shell 18 and extend in the radial direction of the rotating shaft 2 extend inside the strut 19.

To be specific, the portions of the air pipe 31 and the first and second oil mist pipes 41 and 51 which portions are located inside the strut 19 do not contact the air flowing through the bypass passage B. In other words, in Modified Example 1, the air pipe 31 includes the first heat exchanger 32 extending in the axial direction of the rotating shaft 2 but does not include the second heat exchanger 33 extending in the radial direction of the rotating shaft 2. Moreover, the first oil mist pipe 41 does not include the third heat exchanger 42. Furthermore, the second oil mist pipe 51 includes the fifth heat exchanger 53 extending in the axial direction of the rotating shaft 2 but does not include the fourth heat exchanger 52 extending in the radial direction of the rotating shaft 2.

In FIG. 4, the hollow strut 19 is shown, but the strut 19 may be solid. Moreover, the air pipe 31 and the first and second oil mist pipes 41 and 51 may be defined by, for example, inner peripheral walls of air passages formed in the solid strut 19.

Since the air pipe 31 includes the first heat exchanger 32, and the second oil mist pipe 51 includes the fifth heat exchanger 53, the same effects as in Embodiment 1 are obtained in Modified Example 1.

Embodiment 2

Figure 5:
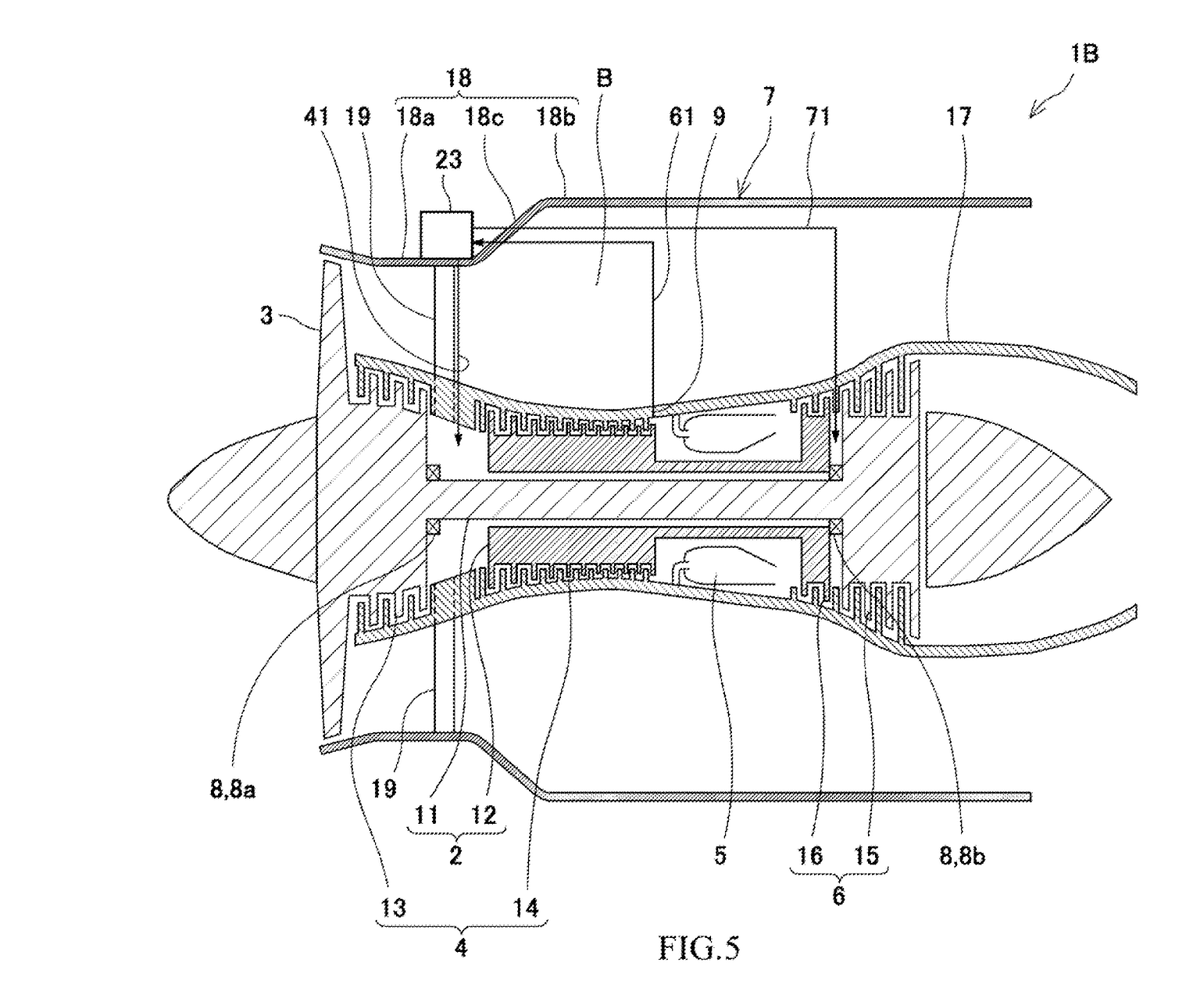
FIG. 5 is a schematic sectional view of the aircraft gas turbine engine according to Embodiment 2.
Figure 6:
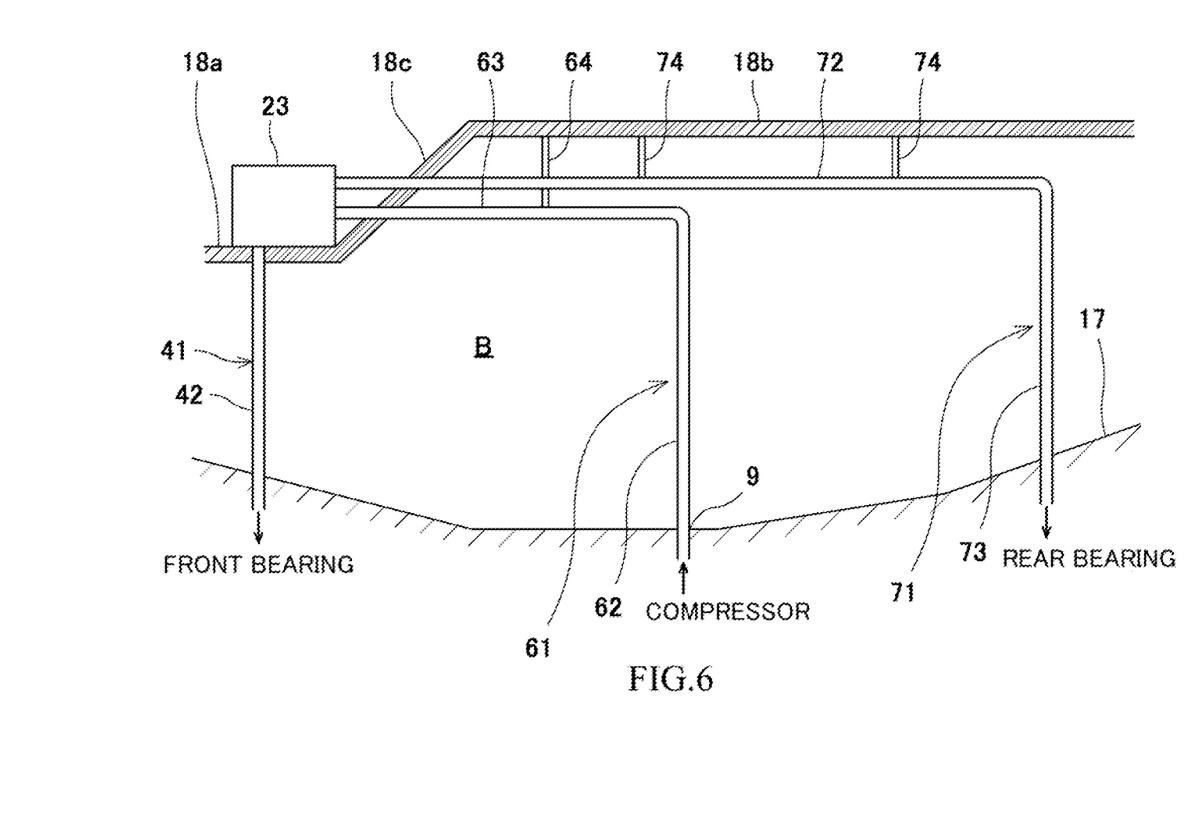
FIG. 6 is an enlarged view of a part of the bypass passage shown in FIG. 5.

Next, an aircraft gas turbine engine 1B according to Embodiment 2 will be described with reference to FIG. 5 and FIG. 6. FIG. 5 is a sectional view of the aircraft gas turbine engine 1B according to Embodiment 2. FIG. 6 is an enlarged view of a part of the bypass passage B shown in FIG. 5. In FIG. 6, the strut 19 is not shown. Embodiment 2 is different from Embodiment 1 in that instead of the air pipe 31 and the second oil mist pipe 51 supported by the outer surface of the inner shell 17, an air pipe 61 and a second oil mist pipe 71 supported by an inner surface of the outer shell 18 are included. In the following description, the air pipe 61 and the second oil mist pipe 71 will be described, and explanations of the other components are omitted.

The air pipe 61 extends in the bypass passage B outward in the radial direction from the extraction port 9. Then, the air pipe 61 extends forward in the axial direction of the rotating shaft 2 along the inner surface of the outer shell 18 in the vicinity of the inner surface of the outer shell 18, penetrates the third region 18c of the outer shell 18, and is connected to the oil mist generator 23.

The air pipe 61 includes a first heat exchanger 62 and a second heat exchanger 63. The first and second heat exchangers 62 and 63 are arranged in the bypass passage B and are cooled by contact with the air flowing through the bypass passage B. In the present embodiment, the first and second heat exchangers 62 and 63 are exposed in the bypass passage B.

The first heat exchanger 62 extends in the bypass passage B in the radial direction of the rotating shaft 2 from the extraction port 9 toward the outer shell 18. A downstream end portion of the first heat exchanger 62 in the flow direction of the compressed air is connected to an upstream end portion of the second heat exchanger 63 in the flow direction of the compressed air. The second heat exchanger 63 extends in the bypass passage B in the axial direction of the rotating shaft 2 along the inner surface of the outer shell 18. Specifically, the second heat exchanger 63 extends from a position corresponding to the extraction port 9 in the axial direction of the rotating shaft 2 to a surface of the outer shell 18 opposite to the third region 18c of the outer shell 18. The second heat exchanger 63 is supported by the inner surface of the outer shell 18 through at least one support 64 extending in the radial direction. The compressed air flowing in the first and second heat exchangers 62 and 63 is cooled by the low-temperature air flowing through the bypass passage B and is guided to the oil mist generator 23.

The second oil mist pipe 71 extends rearward from the oil mist generator 23B and penetrates the third region 18c of the outer shell 18 in the axial direction of the rotating shaft 2. Then, the second oil mist pipe 71 extends in the bypass passage B in the axial direction of the rotating shaft 2 along the inner surface of the outer shell 18, extends in the radial direction at a position corresponding to the rear bearing 8b in the axial direction, and penetrates the inner shell 17.

The second oil mist pipe 71 includes a fourth heat exchanger 72 and a fifth heat exchanger 73. The fourth and fifth heat exchangers 72 and 73 are arranged in the bypass passage B and are cooled by contact with the air flowing through the bypass passage B. In the present embodiment, the fourth and fifth heat exchangers 72 and 73 are exposed in the bypass passage B.

The fourth heat exchanger 72 extends along the inner surface of the outer shell 18 from a surface of the outer shell 18 opposite to the third region 18c of the outer shell 18 to a position corresponding to the rear bearing 8b in the axial direction of the rotating shaft 2. The fourth heat exchanger 72 is supported by the inner surface of the outer shell 18 through at least one support 74 extending in the radial direction. A downstream end portion of the fourth heat exchanger 72 in the flow direction of the oil mist is connected to an upstream end portion of the fifth heat exchanger 73 in the flow direction of the oil mist. The fifth heat exchanger 73 is located at a position corresponding to the rear bearing 8b in the axial direction of the rotating shaft 2. The fifth heat exchanger 73 extends in the bypass passage B in the radial direction of the rotating shaft 2. The oil mist flowing in the fourth and fifth heat exchangers 72 and 73 is cooled by the low-temperature air flowing through the bypass passage B and is guided to the rear bearing 8b.

In the present embodiment, the same effects as in Embodiment 1 are obtained. Moreover, the second heat exchanger 63 and the fourth heat exchanger 72 extending in the bypass passage B in the axial direction are supported by the inner peripheral surface of the outer shell 18. Therefore, as compared to a case where the second heat exchanger 63 and the fourth heat exchanger 72 are supported by the inner shell 17, heat is hardly transferred from the inner shell 17 to the second heat exchanger 63 and the fourth heat exchanger 72, and cooling performance of the second heat exchanger 63 and the fourth heat exchanger 72 can be improved.

Moreover, in the present embodiment, in a front view of the gas turbine engine 1B, the second heat exchanger 63 and the fourth heat exchanger 72 are located so as to overlap the third region of the outer shell 18. Therefore, foreign matters having entered into the bypass passage B hardly contact the second heat exchanger 63 and the fourth heat exchanger 72. Furthermore, the air pipe 61 and the oil mist pipe 71 extend in the bypass passage B in the axial direction and penetrate the third region 18c. Therefore, as compared to a case where the air pipe 61 and the oil mist pipe 71 penetrate the second region 18b, increases in entire lengths of the air pipe 61 and the oil mist pipe 71 can be suppressed.

Modified Example 2

Figure 7:
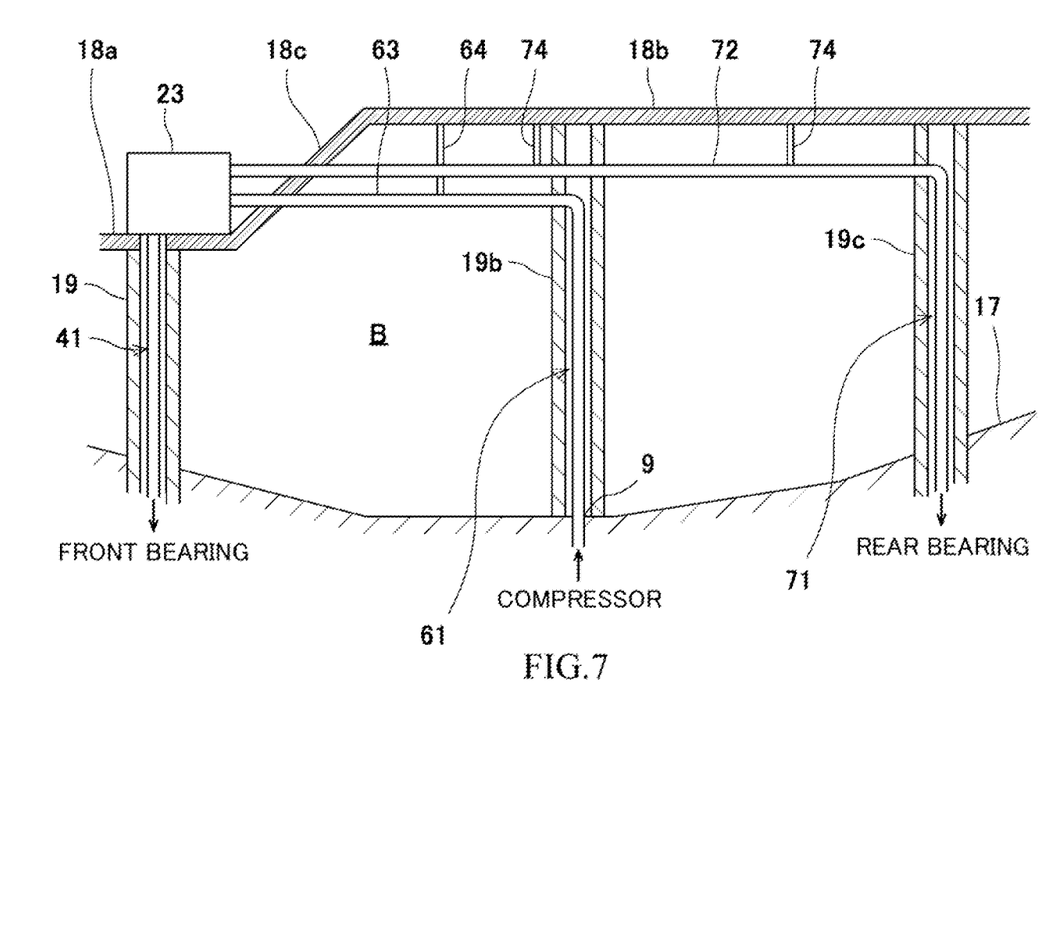
FIG. 7 is an enlarged view of a part of the bypass passage of the aircraft gas turbine engine according to Modified Example 2 of Embodiment 2.

FIG. 7 is an enlarged view of a part of the bypass passage of the aircraft gas turbine engine according to Modified Example 2 of Embodiment 2. In Modified Example 2, in addition to the strut 19, the casing 7 includes struts 19b and 19c that couple the inner shell 17 to the outer shell 18. The strut 19b is arranged at a position corresponding to the extraction port 9 in the axial direction of the rotating shaft 2. The strut 19c is arranged at a position corresponding to the rear bearing 8b in the axial direction of the rotating shaft 2. The struts 19, 19b, and 19c are hollow. The struts 19, 19b, and 19c are formed such that the air from the bypass passage B does not flow into internal spaces of the struts 19, 19b, and 19c.

A portion of the air pipe 61 which portion extends in the axial direction of the rotating shaft 2 penetrates a peripheral wall of the strut 19b. A portion of the air pipe 61 which portion is located between the inner shell 17 and the outer shell 18 and extends in the radial direction of the rotating shaft 2 extends inside the strut 19b. The portion of the air pipe 61 which portion is located inside the strut 19 does not contact the air flowing through the bypass passage B. In other words, in Modified Example 2, the air pipe 61 includes the second heat exchanger 63 extending in the axial direction of the rotating shaft 2 but does not include the first heat exchanger 62 extending in the radial direction of the rotating shaft 2.

A portion of the first oil mist pipe 41 which portion is located between the inner shell 17 and the outer shell 18 and extends in the radial direction of the rotating shaft 2 extends inside the strut 19. In Modified Example 2, as with Modified Example 1, the first oil mist pipe 41 does not include the third heat exchanger 42.

A portion of the second oil mist pipe 71 which portion extends in the axial direction of the rotating shaft 2 penetrates a peripheral wall of the strut 19c, and a portion of the second oil mist pipe 71 which portion is located between the inner shell 17 and the outer shell 18 and extends in the radial direction of the rotating shaft 2 extends inside the strut 19c. The portion of the second oil mist pipe 71 which portion is located inside the strut 19 does not contact the air flowing through the bypass passage B. In other words, in Modified Example 2, the second oil mist pipe 71 includes the fourth heat exchanger 72 extending in the axial direction of the rotating shaft 2 but does not include the fifth heat exchanger 73 extending in the radial direction of the rotating shaft 2.

In FIG. 7, the hollow struts 19, 19b, and 19c are shown, but the struts 19, 19b, and 19c may be solid. Moreover, the air pipe 61 and the first and second oil mist pipes 41 and 71 may be defined by, for example, inner peripheral walls of air passages formed in the solid struts 19, 19b, and 19c.

Since the air pipe 61 includes the second heat exchanger 63, and the second oil mist pipe 71 includes the fourth heat exchanger 72, the same effects as in Embodiment 2 are obtained in Modified Example 2.

Other Embodiments

OTHER EMBODIMENTS

The present disclosure is not limited to the above-described embodiments, and various modifications may be made within the scope of the present disclosure.

For example, the number of air pipes, the number of oil mist pipes, the positions of the air pipes and the oil mist pipes in the gas turbine engines 1A and 1B, and the like are not limited to the above embodiments.

For example, the gas turbine engine according to each of at least some of the embodiments of the present disclosure may include air pipes, and in this case, only at least one of the air pipes may include a heat exchanger. The gas turbine engine may include extraction ports, and the air pipes may be connected to the respective extraction ports. Moreover, the air pipe connected to one extraction port may include branch pipes extending from the pipe, and each of the branch pipes may include a heat exchanger arranged in the bypass passage.

For example, the gas turbine engine according to each of at least some of the embodiments of the present disclosure may include one oil mist pipe or may include three or more oil mist pipes. Only at least one of the oil mist pipes may include a heat exchanger. For example, in Embodiment 1, only one of the first and second oil mist pipes 41 and 51 may include a heat exchanger.

The number of oil mist pipes and the number of bearings 8 may be equal to each other or may be different from each other. For example, the first oil mist pipe 41 may supply the oil mist to front bearings (for example, a bearing supporting the low-pressure shaft 11 and a bearing supporting the high-pressure shaft 12) located in front of the extraction port 9. For example, the second oil mist pipe 51 may supply the oil mist to rear bearings (for example, a bearing supporting the low-pressure shaft 11 and a bearing supporting the high-pressure shaft 12) located behind the extraction port 9.

Moreover, in each of Embodiment 1 and Embodiment 2, the air pipe may include only one of the first heat exchanger and the second heat exchanger. In other words, one of a portion of the air pipe which portion extends in the axial direction of the rotating shaft and a portion of the air pipe which portion extends in the radial direction may be completely covered with a protection so as not to contact the air flowing through the bypass passage. Moreover, the second oil mist pipe may include only one of the fourth heat exchanger and the fifth heat exchanger. In other words, one of a portion of the second oil mist pipe which portion extends in the axial direction of the rotating shaft and a portion of the second oil mist pipe which portion extends in the radial direction may be completely covered with a protection so as not to contact the air flowing through the bypass passage. The protection that covers the pipe such that the pipe does not contact the air flowing through the bypass passage may be the strut as described in Modified Example 1 and Modified Example 2.

Moreover, a part or whole of each of the heat exchangers included in the air pipe and the oil mist pipe does not have to be exposed and may be covered with a protection (not shown) so as to be able to contact the air flowing through the bypass passage B. For example, the protection may include holes through which air flows.

The position of the extraction port is not limited to the above embodiments. For example, the extraction port may be located at a position corresponding to the third region 18c in the axial direction of the rotating shaft 2, and for example, may be located at a position corresponding to the oil mist generator 23 in the axial direction of the rotating shaft 2.

Each of the heat exchangers extending in the axial direction in the air pipe and the oil mist pipe is supported by the support 34 extending in the radial direction. However, a method of supporting the air pipe and the oil mist pipe in the bypass passage is not limited to this. The heat exchanger extending in the axial direction in the bypass passage may be in contact with the outer surface of the inner shell or the inner surface of the outer shell.

The shape of the casing 7 is not limited to the above embodiments. The oil mist generator 23 does not have to be located in the first region 18a. The oil mist generator 23 may be located at a position corresponding to the extraction port 9 in the axial direction of the rotating shaft 2 or a position behind the extraction port 9 in the axial direction of the rotating shaft 2. Moreover, the number of oil mist generators included in the oil mist generator 23 may be one or may be three or more. When the gas turbine engine includes oil mist generators, some of the oil mist generators may be located in front of the extraction port, and the other oil mist generators may be located behind the extraction port.

Moreover, the gas turbine engine according to each of at least some of the embodiments of the present disclosure is not limited to a two-shaft gas turbine engine and may be a single-shaft gas turbine engine.

The invention claimed is:

1. A gas turbine engine comprising,
   a fan that is in front of a compressor, a combustor and a turbine, and rotates in association with a rotating shaft;
   a casing including
      an inner shell and an outer shell and
      a bypass passage through which part of air supplied by the fan flows, the bypass passage being between the inner shell and the outer shell;
   bearings inside the inner shell;
   an oil mist generator that is outside the outer shell and generates oil mist by mixing oil with compressed air extracted from the compressor through at least one extraction port;
   at least one air pipe through which the compressed air extracted from the compressor is guided to the oil mist generator; and
   at least one oil mist pipe through which the oil mist generated by the oil mist generator is guided to the bearings, wherein
   at least one of the air pipe and the oil mist pipe includes a heat exchanger that is in the bypass passage and is cooled by the air flowing through the bypass passage.

2. The gas turbine engine according to claim 1, wherein at least part of the heat exchanger extends in the bypass passage in an axial direction of the rotating shaft.

3. The gas turbine engine according to claim 2, wherein:
   the oil mist generator is on an outer peripheral surface of the outer shell and in front of or behind the extraction port;
   at least the air pipe includes the heat exchanger; and
   at least part of the heat exchanger of the air pipe extends in the bypass passage in the axial direction, the at least part of the heat exchanger being between the extraction port and the oil mist generator in the axial direction.

4. The gas turbine engine according to claim 3, wherein:
   the outer peripheral surface of the outer shell includes
      a first region being in front of the extraction port,
      a second region being behind the first region and larger in diameter than the first region, and
      a third region connecting the first region and the second region; and
   the oil mist generator being in the first region.

5. The gas turbine engine according to claim 4, wherein at least one of the air pipe and the oil mist pipe extends in the bypass passage in the axial direction and penetrates the third region.

6. The gas turbine engine according to claim 1, wherein:
   the bearings includes
      a front bearing in front of the extraction port and
      a rear bearing behind the extraction port;
   the oil mist generator includes a first oil mist generator and a second oil mist generator;
   the at least one oil mist pipe includes
      a first oil mist pipe through which the oil mist generated by the first oil mist generator is guided to the front bearing and
      a second oil mist pipe through which the oil mist generated by the second oil mist generator is guided to the rear bearing; and
   the second oil mist pipe includes the heat exchanger in the bypass passage, at least part of the heat exchanger extending in the axial direction of the rotating shaft.

* * * * *